Figure 1:
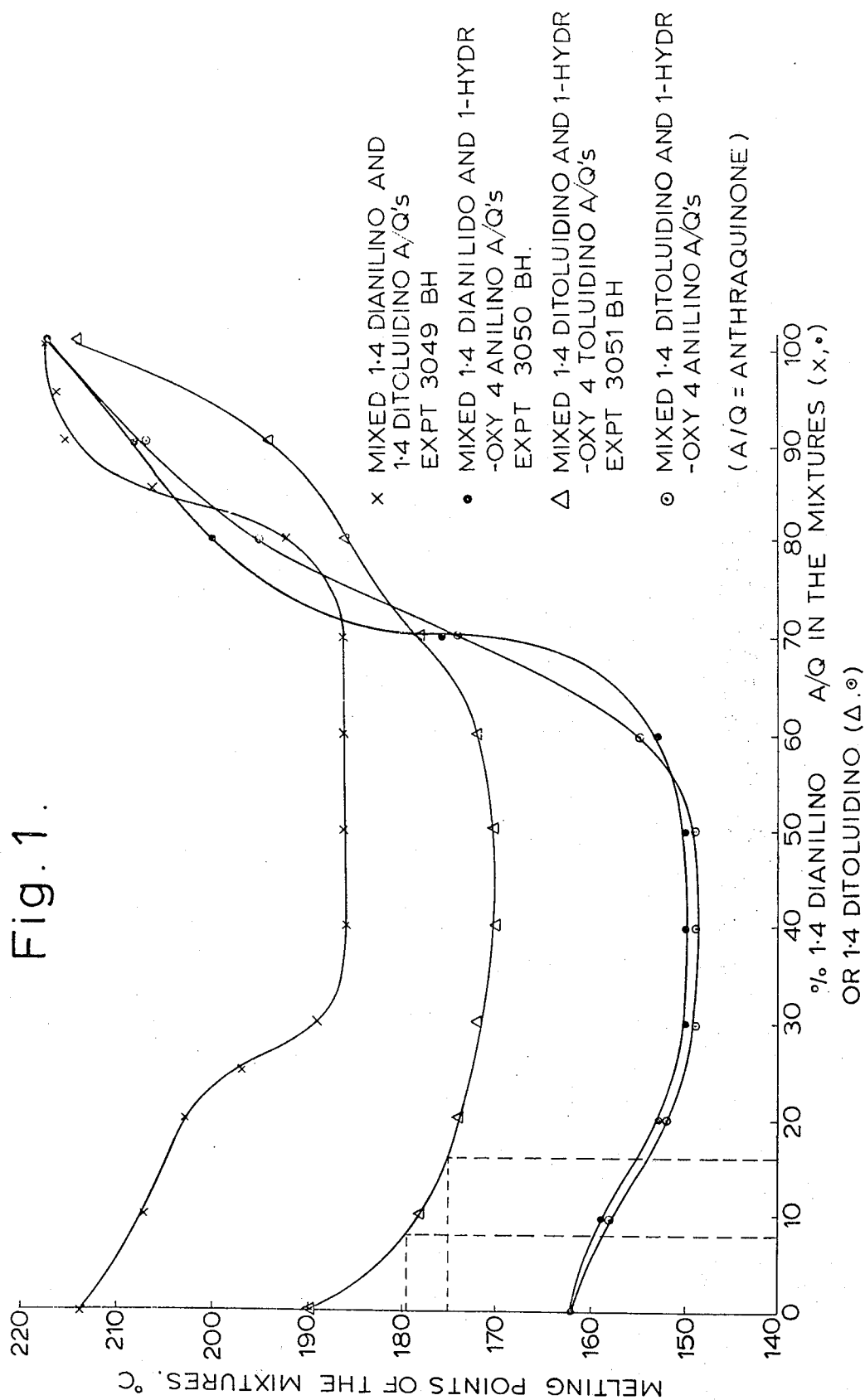
Figure 2:
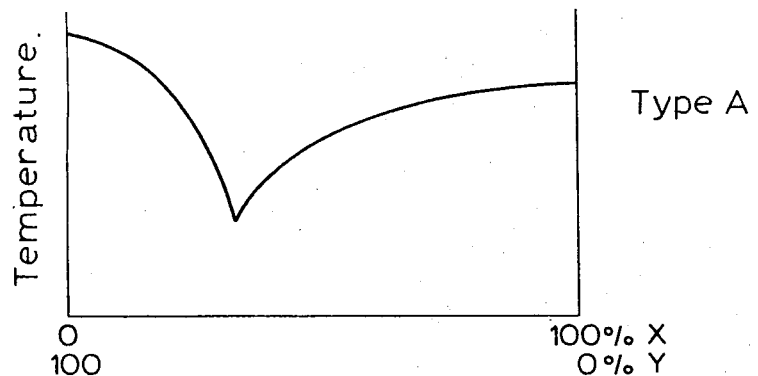
Figure 2:
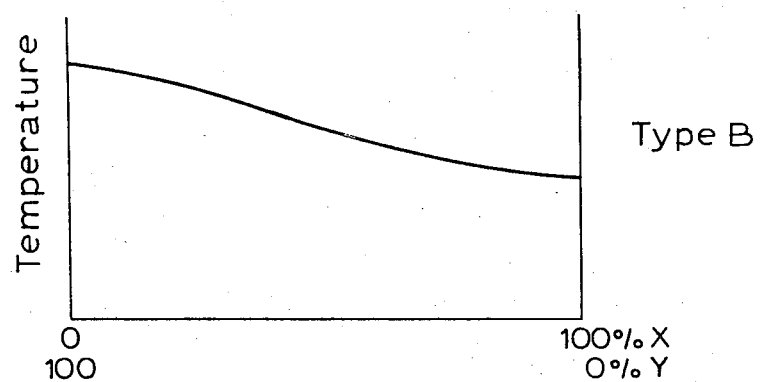
Figure 2:
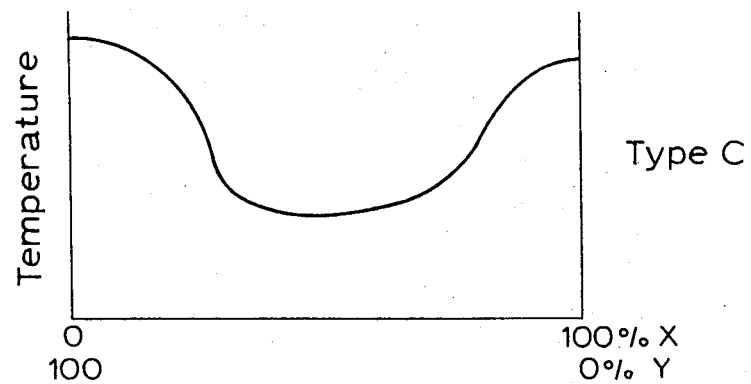

United States Patent [19]

Dixon et al.

[11] 3,989,449

[45] Nov. 2, 1976

[54] DYESTUFF COMPOSITIONS

[75] Inventors: Leonard Fox Dixon, Elland; Bryan Ronald Hinchcliffe, Scholes near Holmfirth; Cyril Eric Vellins, Gatley, all of England

[73] Assignee: L. B. Holliday & Co. Limited, Huddersfield, England

[22] Filed: Jan. 19, 1973

[21] Appl. No.: 324,978

Related U.S. Application Data

[63] Continuation-in-part of Ser. No. 14,634, Feb. 26, 1970, abandoned.

[30] Foreign Application Priority Data

Mar. 4, 1969 United Kingdom............... 11376/69
Sept. 8, 1969 United Kingdom............... 44231/69

[52] U.S. Cl. ..................................... 8/25; 8/39 B; 8/39 C; 260/380
[51] Int. Cl.$^2$ ......................................... D06P 3/00
[58] Field of Search ............... 8/25, 26, 39 R, 39 B, 8/39 C; 260/378, 380, 381

[56] References Cited
UNITED STATES PATENTS

| | | | |
|---|---|---|---|
| 2,060,186 | 11/1936 | Felix et al. .................................... | 8/5 |
| 2,506,020 | 5/1950 | Grossmann et al. ....................... | 8/25 |
| 3,207,568 | 9/1965 | Lerch et al. ................................ | 8/26 |
| 3,444,214 | 5/1969 | Buecheler .............................. | 260/378 |
| 3,558,670 | 1/1971 | Hohmann et al. ..................... | 8/40 X |

FOREIGN PATENTS OR APPLICATIONS

| | | | |
|---|---|---|---|
| 91,149 | 10/1894 | Germany | |
| 91,150 | 10/1894 | Germany | |
| 91,152 | 3/1896 | Germany | |
| 6,602,154 | 8/1966 | Netherlands | |
| 1,085,063 | 9/1967 | United Kingdom................. | 260/378 |
| 248,874 | 3/1926 | United Kingdom................. | 260/378 |

*Primary Examiner*—Samuel W. Engle
*Assistant Examiner*—Peter A. Nelson
*Attorney, Agent, or Firm*—William R. Liberman

[57] ABSTRACT

A dyestuff composition comprising a dyestuff of the general formula (I):

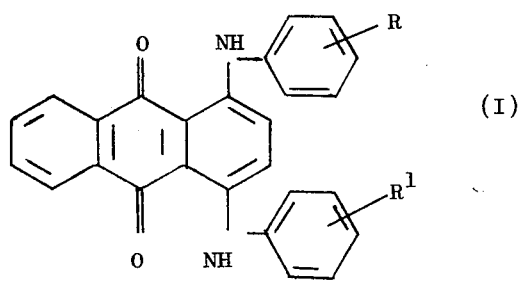

in which
R and R$^1$ are selected from the group consisting of identical and different hydrogen, lower alkyl, lower alkoxy, acyl, acyloxy and halogen radicals;

and at least one further dyestuff having a synergistic effect on the dyeing properties of the dyestuff (I) said further dyestuff being selected from the group consisting of (I) but different from said first dyestuff and dyestuffs of general formula (II):

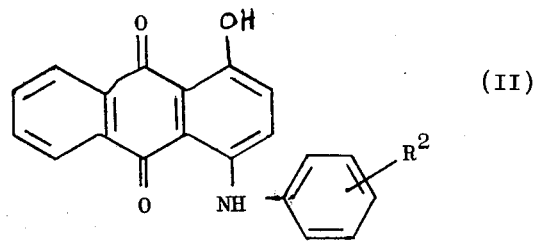

in which
R$^2$ has the same meaning as R and R$^1$.

The dyestuff composition has utility in the dyeing of synthetic fibers, in particular polyester fibers.

24 Claims, 2 Drawing Figures

Type A

Type B

Type C

DYESTUFF COMPOSITIONS

This application is a continuation-in-part of application Ser. No. 14,634 filed Feb. 26, 1970, and now abandoned.

This invention relates to dyestuff compositions which are for colouring synthetic materials, in particular polyester fibres.

It is well known in the art that 1:4-dianilinoanthraquinone and indeed any 1:4-symmetrically substituted alkyl-aryl derivatives such as 1:4-di-p-toluidino anthraquinone has little or no affinity for polyester fibres as a disperse dyestuff.

We have now found that certain mixtures of dyestuffs which contain as one component a 1:4-diarylamino anthraquinone compound and as a further component at least one 1:4-diarylamino anthraquinone compound different from said first component, and/or at least one disperse dyestuff of a different class acting synergistically on the 1:4-diarylamino anthraquinone making up the first component surprisingly, have much enhanced dyeing properties on synthetic fibres. The dyestuffs can be applied to the synthetic fibres by carrier dyeing, pressure dyeing or by the Thermosol process.

The invention therefore provides a dyestuff composition comprising a dyestuff of the general formula:

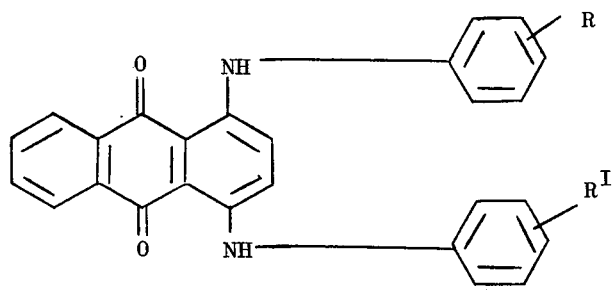

(I)

in which R and R' are selected from the groups consisting of identical and different hydrogen, lower alkyl, lower alkoxy, acyl, acyloxy and halogen radicals and at least one further dyestuff having a synergistic effect on the dyeing properties of the above dyestuff, said further dyestuff being selected from the groups consisting of dyestuffs of the general formula (I) but different from said first dyestuff and dyestuffs of formula (II):

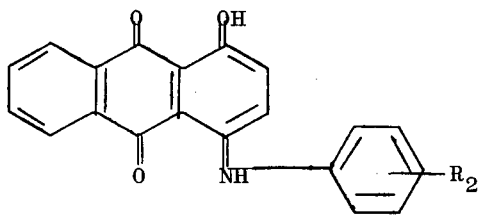

(II)

in which $R_2$ has the same meaning as R and $R_I$.

The invention also provides a process for the dyeing of synthetic fibres in which a composition according to the invention is used.

Examples of synthetic fibres which it has now been found are dyeable with the compositions of the invention include polyesters and in addition in particular acetate fibres, such as triacetate and diacetate, polyamide fibres such as nylon 6 and nylon 66 and polypropylene fibres such as nickel modified polypropylene and other modified polypropylenes e.g. "Meraklon" (Registered Trade Mark of the Montecatini Edison Group), or disperse — dyeable polypropylene.

Representative compositions are those specified in the Examples.

Where the mixture contains two or more anthraquinone dyestuffs, the mixture may result from the method of preparation, as for example is described in Example 2, or it may be made by physical admixture of the component dyestuffs.

The ratios of the dyestuffs in the dyestuff compositions may be varied within a wide range. The dyestuff composition may contain at least one dispersing agent and other additions normally present in the preparation of other disperse dyestuffs such as standardising agents.

Examples of effective dye mixtures include not only the physical and reaction mixtures referred to above but such mixtures to which further components are added.

One complex example is a mixture of (A) 1,4-dianilinoanthraquinone, 1-4-di-p-toluidinoanthraquinone and 1-anilino-4-p-toluidinoanthraquinone with (B) 1-hydroxy-4-anilinoanthraquinone and (C) 1-hydroxy-4-f-toluidinoanthraquinone.

Another example is a 50/50 mixture of composition (A) just mentioned with a mixture of 1,5/1,8-dianilinoanthraquinones.

The synergistic effects noted in accordance with the invention may be explained as follows:

DISPERSE DYEING

Disperse dyeing is normally carried out by contacting a fibre or fabric with an aqueous suspension of dye particles in a dispersing agent solution at a sufficiently high temperature to cause rapid dyeing, which varies depending on the fibre and/or dyestuffs used from 60° C to 140° C. In the latter case, the dyeing is under pressure.

DYEING PURE DYESTUFFS

A disperse dye dyes by dissolving in the fibre to be dyed, to give a solid solution. It obeys the laws of solubility in that up to saturation in one of the two phases involved, fibre or water, at equilibrium, the ratio of the dye concentration in the two solvents is constant (the distribution constant). A useful dye has a low, but finite, solubility in water and a high solubility in the fibre, and thus at equilibrium only minimal amounts of dye are left in the dyebath. During dyeing, dye dissolves from the dye particles into the water phase, from which it is absorbed into the fibre phase. Solution of dye in water is much more rapid than diffusion of dye into the fibre, so the strength of the aqueous solution is substantially constant until most of the dye has dyed on the fibre. Raising the temperature increases the diffusion rate in the fibre, and thus also the dyeing rate. Clearly, other properties being equal, doubling the solubility in water doubles the rate of dyeing, but of course this doubles the amount of dye left in the bath at equilibrium also. Apart from the temperature, solubility in water is increased by the addition of dispersing agents, which cause micelle formation. This can only be used to a limited extent as if too much dispersing agent is present the micelles are stabilised and dyeing is prevented. Grinding the particles as finely as possible increases solubility by surface area increase (the Ostwald effect). This is limited by grinding reaching a point where crystal regrowth-rate equals crystal break-down rate. High intrinsic solubility in water causes other problems as well as dye left in the bath, as mentioned previously. Wash fastness obviously suffers and specking increases, due to rapid regrowth of crystals in the dye dispersion.

DYEING OF MIXTURES

Mixtures behave in similar but more complicated manner. The dyes may, or may not, interact with each other. There are several different categories:

I. Dyes which do not interact give a melting point curve of type A, and usually have a low melting eutectic point. Dyeings produced by such mixtures are simply additive i.e. if dye X dyed by itself gives (a) % dyeing and dye Y similarly gives a (b) % dyeing, then the same amounts of X and Y dyed together in the same dyebath give a resultant dyeing having (a + b)% dyestuffs on the fibre. Dyeing rate is usually faster with such mixtures, as solubility is increased because the lower melting point means a smaller crystal lattice binding energy.

Further, for a given strength of dyeing, if for example X and Y are both blue, the final strength of each needed is less than if either were used singly. This technique of using mixtures to improve dyeing properties is almost as old as disperse dyeing, but it must be stressed that the results are usually additive only, not synergistic which would mean of course that dyeing X and Y together would give a dyeing stronger than a and b taken separately.

II. Dyes which interact from mixed crystals and have a melting point curve similar to B. In this case, each dye is not just in equilibrium with itself on the fibre, but it is in equilibrium with both dyes already on the fibre. The resultant sum of the dyeings is thus less than A + B, and indeed, one dye may not dye significantly at all.

III. We believe we have found a third type of dye behaviour in which the two or more dyes behave synergistically. Our dyes form melting point curves of type C. One possible explanation for this type of curve is that over a large change in % composition the dyes interact, but the mixed dye crystals formed are different from any of the pure crystals formed. This in effect gives the virtues of the low eutectic point of Type A over a large variation in composition. Increases in dyeing rate due to increased solubility caused by lower lattice energy (melting point) very much more than offset the detrimental effect of the interacting dyes. Evidence of this behaviour is the melting point curves and dyeings of various mixtures and solubility data of a typical pair of dyes 1,4-di-p-toluidino-anthraquinone (X) and 1,4-di-anilino-anthraquinone (Y).

Solubility in toluene at 20° C of X is 1.18 %, of Y is 0.64 % and of X and Y is 2.44%. Clearly, this is not simply additive. X has a melting point of 214° C, Y has a melting point of 216° C and crystals obtained by evaporating the toluene solution of X and Y have a melting point of 186° C.

Although many variations may be made in the ratios of components to one another, we have found by extensive experiment that, particularly in the case of reactions of mono- and d-di-substituted compounds, e.g. 1-hydroxy,4-anilino or toluidino and 1,4-dianilino or 1,4-di-toluidino compounds, the useful samples vary substantially in the 80:20 to 20:80 range of weight ratios. The preferred range of weight ratios is 70:30 to 30:70 and about 50:50 mixtures are aften particularly preferred.

The following Examples illustrate the invention:

EXAMPLE 1

A 50/50 physical mixture was prepared by dissolving 10 parts of 1,4-di-p-toluidino anthraquinone and 10 parts of 1,4-dianilino anthraquinone in 100 parts of 94% sulphuric acid below 25° C. The solution was poured on to 1000 parts of ice/water, filtered, washed and dispersed by grinding in a ball mill with 20 parts of 'Reax 8IA' (a proprietary brand of lignin sodium sulphonate — Westvaco Ligno Chemicals), and sufficient water to make the total weight of paste up to 200 parts. This paste (3034 F) had a colour content of 10%.

The individual compounds 1,4-dianilinoanthraquinone (3019 F) and 1,4-di-p-toluidino anthraquinone (3005 F) were similarly dispersed. Dyeings of the mixture (3034 F) on polyester clearly show an increase in affinity over the individual compounds (3019 F) and (3005 F).

The required 1,4 di-p-toluidino anthraquinone was prepared as follows:

A mixture of 750 parts methylated spirits, 450 parts of paratoluidine, 118 parts of 36% hydrochloric acid, 230 parts of 100% quinizarin, 112 parts of boric acid and 19 parts of zinc dust was refluxed 16 hours. The mixture was cooled to 40° C., 90 parts sodium hydroxide were added, then boiled one hour, filtered, washed with 1500 parts of boiling methylated spirits containing 60 parts of sodium hydroxide, and then with hot water. Finally, the cake is washed with boiling water, acidified with hydrochloric acid, then water and dried. Yield: 331 parts. This product was recrystallised from toluene, to remove insolubles and a small amount of mono condensation product, till the compound was chromatographically pure.

Chromatographically pure 1,4-di-anilino anthraquinone is made similarly using 850 parts of methylated spirits, 375 parts of aniline, 113 parts hydrochloric acid, 230 parts of quinizarin, 112 parts of boric acid and 19 parts of zinc dust, in the condensation.

EXAMPLE 2

A series of physical mixtures of 1,4-di-p-toluidino anthraquinone and 1-hydroxy-4-p-toluidino anthraquinone were dispersed and dyed as in Example 1. These dyeings are labelled 3005 BH B to E respectively.

|  | % 1,4-di-p-toluidino anthraquinone | 1-hydroxy-4-p-toluidino anthraquinone |
|---|---|---|
| 3005 BH B | 20 | 80 |
| 3005 BH C | 40 | 60 |
| 3005 BH D | 60 | 40 |
| 3005 BH E | 80 | 20 |

The violet component, 1-hydroxy-4-p-toluidino Anthraquinone, clearly helps the green component (1,4-di-p-toluidino anthraquinone) to dye. This is readily seen by comparison of the exhaust of the strong shade of 3005 BH C (which originally had 4.8 % green in the dyebath) with the exhaust 4.8% shade (3005 BH F).

The pure 1-hydroxy-4-p-toluidinoanthraquinone was prepared as follows:

A mixture of 750 parts methylated spirits, 230 parts quinizarin (100%), 112 parts boric acid, 110 parts of p-toluidine, 6 parts zinc dust and 18 parts of hydrochloric acid (36%) was refluxed for 16 hours, cooled to 40° C. and filtered. The cake was washed with 150 parts of methylated spirits at 80° C and then with hot water. The cake was then dissolved in 1200 parts of water and 560 parts of 30% aqueous sodium hydroxide, by heating to the boil for 1 hour. The product was re-precipitated by the addition of a further 120 parts of water and reboiled, filtered, washed alkali free and dried.

The product was purified by recrystallisation from toluene until chromatographically pure.

EXAMPLE 3

A series of physical mixtures of 1,4-di-anilino anthraquinone and 1-hydroxy-4-anilinoanthraquinone were dispersed and dyed as in Example 1. These dyeings are labelled 3019 BH B to E, respectively.

|  | % 1,4-di-anilino-anthraquinone | % 1-hydroxy-4-anilino-anthraquinone |
|---|---|---|
| 3019 BH B | 20 | 80 |
| 3019 BH C | 40 | 60 |
| 3019 BH D | 60 | 40 |
| 3019 BH E | 80 | 20 |

That the green dye (the disubstituted compound) dyes better on the fibre when mixed with a violet 1-hydroxy-4-anilino-anthraquinone is readily seen if the exhaust of the strong shade of 3019 BH C (containing 4.8% of green dye dispersion originally) is compared with the exhaust of 4.8% dyeing of green only (3019 BH F).

Pure 1-hydroxy-4-anilinoanthraquinone was prepared by the same process as 1-hydroxy-4-p-toluidino anthraquinone, but replacing the 110 parts of para toluidine used by 92 parts of aniline. Recrystallisation was again from toluene.

EXAMPLE 4

Mixtures of 50/50 1-hydroxy-4-anilinoanthraquinone and 1-hydroxy-4-ptoluidinoanthraquinone with 50/50 1,4-dianilino anthraquinone / 1.4 di-p-toluidino anthraquinone (prepared as in Example 1) are employed in dyeings 3034 BH A to F. Exhaustion of these mixtures is better than that of the corresponding examples in 2 and 3. For example, mixture 3034 BH A contains a 100% Violet mixture of 1-hydroxy-4-arylamino anthraquinones made up of equal amounts of 1-hydroxy-4-anilino anthraquinone and 1-hydroxy-4-p-toluidino anthraquinone and mixture 3034 F contains a 100% green mixture of 1,4-di-arylamino anthraquinones made up of equal amounts of 1,4-dianilinoanthraquinone and 1,4-di-p-toluidinoanthraquinone. Dyeings 3034 B to E contain 80%, 60%, 40% and 20% violet mixture respectively.

EXAMPLE 5

A mixture of 1,4-dianilinoanthraquinone, 1,4-di-p-toluidino anthraquinone and 1-anilino-4-p-toluidinoanthraquinone was prepared in the following manner:

A mixture of 800 parts methylated spirits, 100 parts quinizarin 100%, 44.8 parts boric acid, 92 parts p-toluidine, 146.6 parts aniline, 7.6 parts zinc dust and 38.4 parts hydrochloric acid (36%) was refluxed for 16 hours. The mixture was filtered hot, and then washed with a mixture of 250 parts spirits and 25 parts hydrochloric acid (36%) followed by 250 parts spirits, a mixture of 250 parts spirits and 6 g. sodium hydroxide and hot water until alkali free. This product was dispersed and dyed on polyester as in Example 1 to give a green dyeing with good exhaustion and build-up.

EXAMPLE 6

A mixture of the products of Example 5, together with 1-hydroxy-4-anilinoanthraquinone and 1-hydroxy-4-toluidinoanthraquinone was prepared as follows:

A mixture of 750 parts of spirits, 230 parts of 100% quinizarin, 112 parts of boric acid, 82 parts of paratoluidine, 82 parts of aniline and 12 parts of zinc dust was heated to 60° C. and 50 parts of hydrochloric acid (36%) were added. The mixture was then refluxed for 16 hours. A solution of 34 parts of sodium hydroxide in 750 parts of spirits was then added and the mixture was again refluxed for 1 hour, filtered, washed with 750 parts of spirits, and then with hot water. The cake was boiled with 3600 parts water, 110 parts hydrochloric acid (28%), filtered, washed acid free and dried. This product had a green (1,4-diarylanthraquinone) content of 36% the rest being mainly the two 1-hydroxy-4-aryl-aminoanthraquinones. It was dispersed and dyed similarly to the products of Example 1, to give navy-blue shades with a good build-up and exhaust.

EXAMPLE 7

A 50/50 mixture of the product of Example 5 and a mixture of 1,5/1,8-dianilino anthraquinones was dispersed as in Example 1, to give a navy-blue shade with a good build-up and exhaust, but with a better sublimation fastness than the product of Example 6.

The 1,5/1,8-dianilinoanthraquinone mixture was prepared as follows:

A mixture of 160 parts of aniline, 34.6 parts of mixed 1,5/1,8-dinitroanthraquinones (prepared by nitration of anthraquinone in sulphuric acid with an excess of nitric acid), 12 parts of sodium carbonate, and 24 parts of sodium acetate, was refluxed for 10 hours, removing water formed by slow distillation. The mixture was steam-distilled, to remove excess aniline, boiled with dilute hydrochloric acid to remove by - products of the process, filtered, washed and dried.

EXAMPLE 8

A dispersion containing either 1 : 4 -dianilino anthraquinone or 1 : 4 -di-p-toluidino anthraquinone was applied to polyester fibres at 130° C for 30 minutes. The polyester fibre was only tinted a pale bluish green. A polyester fibre dyed in a similar manner with a mixture containing equal parts of the above two dyestuffs was dyed an attractive bluish green. The mixture possessed excellent buildup properties.

EXAMPLE 9

The condensation product of quinizarin with equimolecular proportions of aniline and p-toluidine, which contains a mixture of 1,4-dianilino-; 1, 4-di-p-toluidino- and 1-anilino-4-toluidino-anthraquinone, gave a similar bluish green shade on polyester fibres but possessed slightly better build-up properties than that obtained by the physical mixture described in Example 8.

EXAMPLE 10

A mixture of 15.7 parts of 1-amino-4-anilino anthraquinone, 10.2 parts of anhydrous sodium acetate, 1 part of copper acetate and 100 parts of a mixture of ortho and para bromotoluene (containing 30–40% of ortho) was refluxed for 8 hours. The mixture was cooled, diluted with 70 parts of ethanol, filtered, washed with spirits and the crude product was extracted with toluene. The extracts were concentrated to a small bulk, cooled, filtered and dried, to give 11 parts of a mixture of 1-anilino-4-ortho and para-toluidino anthraquinone compounds with a melting point of approximately 160°–170° C. A dispersion of this mixture gives bluish green shades on polyester fibres when dyed by the methods described below for the dyeing of polyesters.

EXAMPLE 11

If the 1-amino-4-anilino anthraquinone used in Example 10 is replaced by 1,4-diaminoanthraquinone, a mixture of o- and p-methyl-substituted dianilino anthraquinones is obtained. The mixture gives bluish green shades on polyester fibres.

EXAMPLE 12

The condensation product of Example 9 can be used to dye fibres other than polyester by making up 5 gms of a 10% aqueous dispersion of the dye-stuff to a volume of 250 cc with an aqueous solution containing 2 gms/liter of Teepol (Shell) (Registered Trade Mark) as dispersing agent. This dispersion was used for dyeing as follows:

a. Dyeing the triacetate 50 cc of the dyebath liquor is diluted to a total liquor volume of 150 cc with an aqueous solution containing 3 gms/liter Carrier DP 66 (Y.D.C.) (Registered Trade Mark). A 5 gm piece of triacetate is added to the dyebath which is then heated at 100° C for 1 hour. The triacetate is dyed greenish blue shades and possesses excellent fastness properties.

b. Dyeing of acetate

The procedure was as for (a) above but omitting the carrier and dyeing at 85° C for 1 hour. The acetate is dyed in greenish blue shades weaker than the triacetate dyeings.

c. Nylon 6 and Nylon 66

The procedure was as for (a) above but omitting the carrier; the dyeings on nylon 66 are green whereas the dyeings on nylon 6 are greenish blue.

d. Polypropylene (Meraklon and nickel modified polypropylene)

The procedure was as for (c) above and greenish blue shades are obtained.

The method of application of the dyestuff in the case where the fibre is polyester can in general be one of three methods, that is the carrier method, high temperature dyeing method (also known as pressure dyeing) and the Thermosol process. The three methods are described below.

1. Carrier method

The dyebath is set with a suitable carrier (Ortho-phenyl-phenol gives good results) together with 1 gram/liter of Leveller T (Leveller T is a Registered Trade Mark of L.B. Holliday & Co. Ltd.) which is a dinaphthyl methane sulphonic acid and the requisite amount of well dispersed dyestuff (pH 5–6). The goods are entered at 40° C (105° F) and the temperature raised over 45 minutes to 100° C (212° F) this temperature being maintained for one hour. The goods are then well rinsed.

2. High Temperature Dyeing

The dyebath was set with 1 gram/liter of Leveller T and the desired amount of well-dispersed dyestuff at a temperature of 50° C (120° F) and at a pH 6. The goods were then entered and the temperature raised to 130° C (265° F) over 40 minutes. This temperature was maintained for 30 minutes for pale shades and, if necessary up to 90 minutes for heavy shades. When dyeing was complete the liquor was run off and the goods were then completely well rinsed. In certain cases there may be a tendency for dyestuff particles to aggregate on the surface of the fibre, thus giving rise to dyeings of poor fastness to rubbing with consequent loss in fastness to wet treatments. Such dyeings may be after treated with a reducing agent which effects the removal from the surface of the loose colours, whilst not affecting the dyestuff within the fibre; thus a suitable reduction - clear treatment may be effected using:

1—2 grams/liter of Hydrosulphite.
2–3 grams/liter of caustic soda 70° Tw.
3 grams/liter of Leveller LBH (Leveller LBH is a Registered Trade Mark of L.B. Holliday & Co. Ltd.).

at 50° C for 30 minutes, followed by a thorough rinsing.

3. Thermosol Dyeing

The previously prepared goods are padded in a suitable mangle at 30° – 50° C (80° – 120° F) and then dried in suitable equipment. Fixation of the dyestuff follows at 200° – 210° C (380° – 410° F) for 45–60 seconds.

The amount of particular dyestuff used depends on the depth of shade required. A light shade may for example be obtained by the use of 0.1% by weight of dyestuff based on the weight of the fibre, whereas a dark shade may be obtained by use of 5% based on the weight of the fibre. Amounts of dyestuff from 0.1 to 5.0% give varying shades depending on the precise amount used. In the Examples any desired amount within this range may be used. It is further to be understood that the above detailed dyeing methods do not limit the scope of the invention in any way.

We claim:

1. A dyestuff composition comprising in combination at least two dyestuffs having the general formula:

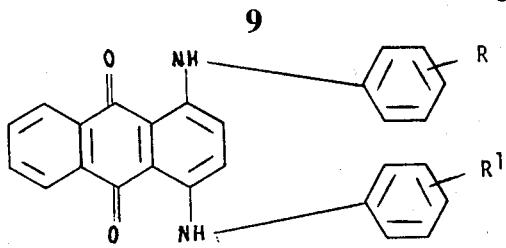

in which R and R¹ are each selected from the groups consisting of hydrogen, lower aklyl, lower alkoxy, acyl, acyloxy and halogen radicals, the two dyestuffs interacting to provide an improved combined effect on the dyeing properties of the dyestuff.

2. A dyestuff composition comprising in combination a first dyestuff of the general formula:

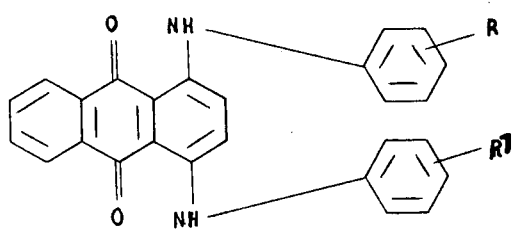

in which R and R¹ are each selected from the groups consisting of hydrogen, lower alkyl, lower alkoxy, acyl, acyloxy and halogen radicals, and at least one additional dyestuff having the general formula:

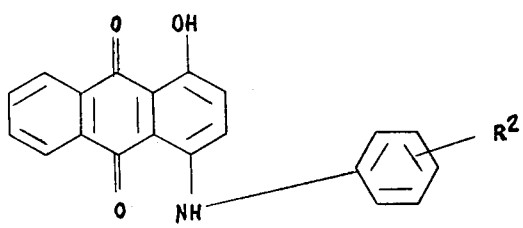

in which $R^2$ is selected from the groups defining R and R¹, the two dyestuffs interacting to provide an improved combined effect on the dyeing properties of the dyestuffs.

3. A dyestuff composition in accordance with claim 2 in which R, R¹ and $R^2$ are all lower alkyl groups.

4. Mixtures according to claim 2 in the range of weight ratios of 80:20 to 20:80.

5. Mixtures according to claim 4 in the range of weight ratios of 70:30 to 30:70.

6. Mixtures according to claim 5 of about 50:50 weight ratio.

7. The dyestuff composition in accordance with claim 1 wherein for the first dyestuff R is a hydrogen atom, R¹ is a lower alkyl group, and for the second dyestuff R and R¹ are both hydrogen.

8. A dyestuff composition in accordance with claim 1 wherein, in the first dyestuff compound, R and R¹ are lower alkyl radicals and, in the second compound, R and R¹ are hydrogen.

9. A dyestuff composition in accordance with claim 1 wherein, in the first compound, R is a hydrogen atom, R¹ is a lower alkyl group, and, in the second dyestuff compound, R and R¹ are both lower alkyl groups.

10. Mixtures of 1,4-di-p-toluidinoanthraquinone and 1,4-dianilinoanthraquinone.

11. Mixtures of 1,4-di-p-toluidinoanthraquinone and 1-hydroxy-4-p-toluidinoanthraquinone.

12. Mixtures of 1,4-di-anilinoanthraquinone and 1-hydroxy-4-anilinoanthraquinone.

13. Mixtures of about 50/50 of 1-hydroxy-4-anilinoanthraquinone and 1-hydroxy-4-toluidinoanthraquinone with about 50/50 of 1,4-dianilinoanthraquinone and 1,4-di-p-toluidinoanthraquinone.

14. Mixtures of 1,4-dianilinoanthraquinone, 1,4-di-p-toluidinoanthraquinone and 1-anilino-4-p-toluidinoanthraquinone.

15. A mixture according to claim 14 further comprising 1-hydroxy-4-anilino-anthraquinone and 1-hydroxy-4-toluidinoanthraquinone.

16. A mixture of 1,4-dianilino 1,4-di-p-toluidino, 1-anilino-4-p-toluidino-, 1,5-dianilino- and 1,8-dianilinoanthraquinones.

17. A method of dyeing a synthetic fiber, comprising applying thereto a dyestuff composition comprising in combination at least two dyestuffs having the general formula:

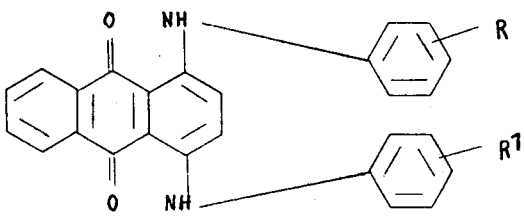

in which R and R¹ are each selected from the groups consisting of hydrogen, lower alkyl, lower alkoxy, acyl, acyloxy and halogen radicals, the two dyestuffs interacting to provide an improved combined effect on the dyeing properties of the dyestuff.

18. A method of dyeing a synthetic fiber, comprising applying thereto a dyestuff composition comprising in combination a dyestuff of the general formula:

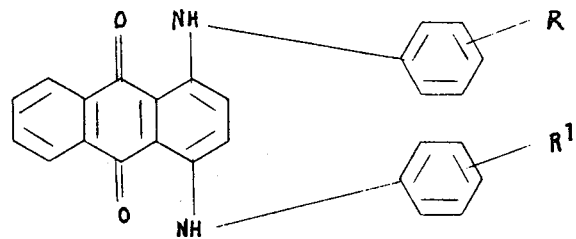

in which R and R¹ are each selected from the groups consisting of hydrogen, lower alkyl, lower alkoxy, acyl, acyloxy and halogen radicals, and at least one additional dyestuff having the general formula:

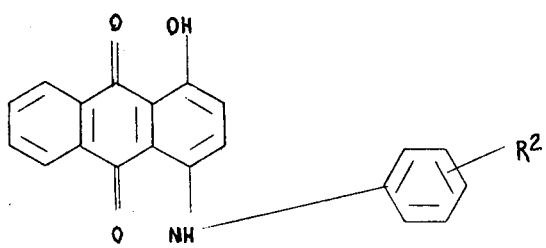

in which $R^2$ is selected from the group defining R and $R^1$, the two dyestuffs interacting to provide an improved combined effect in the dyeing properties of the dyestuffs.

19. A method in accordance with claim 17, wherein the synthetic fiber is selected from the group consisting of polyester acetate, polyamide, polypropylene and modified polypropylene fibers.

20. A method in accordance with claim 18, wherein the synthetic fiber is selected from the group consisting of polyester acetate, polyamide, polypropylene and modified polypropylene fibers.

21. The dyed synthetic fiber having a dyestuff fixed therein comprising a combination of at least two dyestuffs of the general formula:

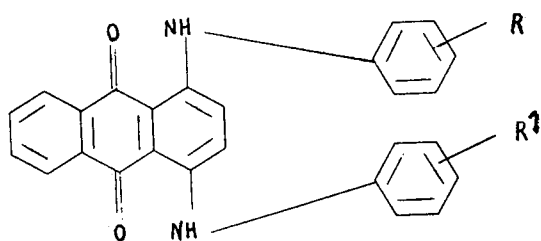

in which R and $R^1$ are each selected from the groups consisting of hydrogen, lower alkyl, lower alkoxy, acyl, acyloxy and halogen radicals, the two dyestuffs interacting to provide an improved combined effect on the dyeing properties of the dyestuff.

22. The dyed synthetic fiber having a dyestuff fixed therein comprising in combination a dyestuff of the general formula:

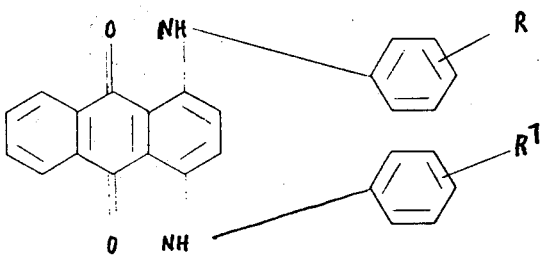

in which R and $R^1$ are each selected from the groups consisting of hydrogen, lower alkyl, lower alkoxy, acyl, acyloxy and halogen radicals, and at least one additional dyestuff having the general formula:

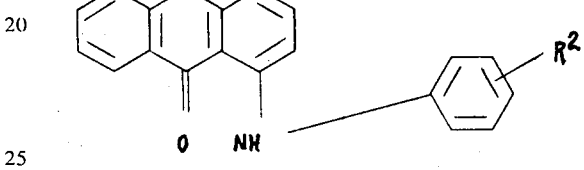

in which $R^2$ is selected from the group defining R and $R^1$, the two dyestuffs interacting to provide an improved combined effect on the dyeing properties of the dyestuffs.

23. The fiber of claim 21, wherein the fiber is formed from a synthetic polymer selected from the group consisting of polyester acetate, polyamide, polypropylene and modified polypropylene.

24. The fiber of claim 22, wherein the fiber is formed from a synthetic polymer selected from the group consisting of polyester acetate, polyamide, polypropylene and modified polypropylene.

* * * * *